(12) United States Patent
Mann et al.

(10) Patent No.: US 8,245,383 B2
(45) Date of Patent: Aug. 21, 2012

(54) MOISTURE SEPARATION SYSTEM AND METHOD OF ASSEMBLING THE SAME

(75) Inventors: Richard M. A. Mann, Berkshire (GB); John C. Davies, Portsmouth (GB)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 12/604,724

(22) Filed: Oct. 23, 2009

(65) Prior Publication Data
US 2011/0094384 A1   Apr. 28, 2011

(51) Int. Cl.
B23P 17/04 (2006.01)
B01D 45/08 (2006.01)
B01D 19/00 (2006.01)

(52) U.S. Cl. ............... 29/592; 55/434; 55/447; 55/456; 95/262; 96/214

(58) Field of Classification Search .................. 55/287, 55/306, 400–408, 434–465, 470, 471, 473, 55/DIG. 21; 95/260–262, 267–270, 277; 96/155, 204, 206, 208, 214, 217, 380, 384–386; 29/592
See application file for complete search history.

(56) References Cited

U.S. PATENT DOCUMENTS

| | | | |
|---|---|---|---|
| 1,570,285 A * | 1/1926 | Schleyer | 415/175 |
| 2,678,133 A * | 5/1954 | Thayer et al. | 210/297 |
| 2,720,313 A * | 10/1955 | Pattison | 210/111 |
| 2,959,008 A * | 11/1960 | Caroli | 60/454 |
| 3,257,957 A * | 6/1966 | Tracy | 415/112 |
| 3,655,058 A * | 4/1972 | Novak | 210/360.1 |
| 4,013,137 A | 3/1977 | Petersen | |
| 4,508,607 A * | 4/1985 | Winyall | 204/517 |
| 4,676,810 A | 6/1987 | El-Saie et al. | |
| 4,936,986 A * | 6/1990 | Tarves, Jr. | 210/321.64 |
| 5,051,072 A | 9/1991 | Yano et al. | |
| 5,064,452 A | 11/1991 | Yano et al. | |
| 5,085,561 A | 2/1992 | Yano et al. | |
| 5,405,249 A * | 4/1995 | Benson | 417/313 |
| 5,755,096 A | 5/1998 | Holleyman | |
| 7,022,153 B2 | 4/2006 | McKenzie | |

FOREIGN PATENT DOCUMENTS

| | | |
|---|---|---|
| CA | 2457203 C | 7/2004 |
| EP | 1262666 A2 | 12/2002 |
| GB | 1195001 A | 6/1970 |

(Continued)

OTHER PUBLICATIONS

GB Search Report issued in connection with corresponding GB Application No. GB1017616.2, Feb. 17, 2011.

(Continued)

Primary Examiner — Robert A Hopkins
Assistant Examiner — Sonji Turner
(74) Attorney, Agent, or Firm — Armstrong Teasdale LLP

(57) ABSTRACT

A method of assembling a moisture separation system for a gas turbine power system is provided. The gas turbine power system includes a filter housing assembly and a weather hood coupled to the filter housing assembly, and the weather hood defines an inlet for directing airflow into the filter housing assembly. The method includes providing a moisture separator and coupling the moisture separator to the weather hood such that the moisture separator extends at least partially across the inlet, the moisture separator rotatable in response to the airflow to facilitate removing moisture from the airflow.

20 Claims, 5 Drawing Sheets

FOREIGN PATENT DOCUMENTS

| | | |
|---|---|---|
| GB | 2133323 A | 7/1984 |
| GB | 2445077 A | 6/2008 |
| JP | 2004124764 A | 4/2004 |
| UA | 0016376 U | 12/2005 |
| WO | 2006077021 A1 | 7/2006 |
| WO | 2008140199 A1 | 11/2008 |

OTHER PUBLICATIONS

Search Report from corresponding GB Application No. 1017616.2 dated Jun. 6, 2011.

* cited by examiner

MOISTURE SEPARATION SYSTEM AND METHOD OF ASSEMBLING THE SAME

BACKGROUND OF THE INVENTION

The field of this disclosure relates generally to moisture separators and, more particularly, to a moisture separator for a gas turbine air filtration system.

Many known gas turbine power systems include filters and moisture separators that facilitate removing moisture and debris from the air before the air is drawn into the compressor of the gas turbine. Specifically, at least some known moisture separators direct air through a series of non-linear channels such that the inertia of the moisture in the air causes the moisture to impact the sidewalls of the channels while the air continues to flow through the channels. As such, the moisture collects on the walls of the channels and is drained from the system.

In that regard, at least some known moisture separators operate in climates with higher annual precipitation levels and/or humidity levels and remain installed during drier periods as well. During the drier periods, air carries dust through the channels without substantial amounts of moisture, thereby facilitating a build-up of dust on the walls of the moisture separator, which can clog the moisture separator and increase overall pressure loss within the gas turbine air filtration system. Therefore, it would be useful to provide a moisture separator that is less likely to be affected by dust during drier climates.

BRIEF DESCRIPTION OF THE INVENTION

In one aspect, a method of assembling a moisture separation system for a gas turbine power system is provided. The gas turbine power system includes a filter housing assembly and a weather hood coupled to the filter housing assembly, and the weather hood defines an inlet for directing airflow into the filter housing assembly. The method includes providing a moisture separator and coupling the moisture separator to the weather hood such that the moisture separator extends at least partially across the inlet, the moisture separator rotatable in response to the airflow to facilitate removing moisture from the airflow.

In another aspect, a moisture separation system for a gas turbine power system that includes a filter housing assembly is provided. The moisture separation system includes a weather hood configured to be coupled to the filter housing assembly, the weather hood defining an inlet for directing airflow into the filter housing assembly. The moisture separation system also includes a moisture separator configured to be coupled to the weather hood such that the moisture separator extends at least partially across the inlet and such that the moisture separator is rotatable in response to the airflow to facilitate removing moisture from the airflow.

In another aspect, a moisture separator for removing moisture from airflow into a housing is provided. The moisture separator includes a first end, a second end, and a body extending from the first end to the second end along a longitudinal axis. The moisture separator is configured to be coupled to the housing at the first end and the second end such that the longitudinal axis extends substantially perpendicular to the airflow and such that the moisture separator is rotatable about the longitudinal axis in response to the airflow.

DETAILED DESCRIPTION OF THE INVENTION

The following detailed description illustrates a moisture separation system and a method of assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, a gas turbine power system. However, it is contemplated that this disclosure has general application to moisture separation in a broad range of systems and in a variety of applications other than gas turbine power systems.

Figure 1:
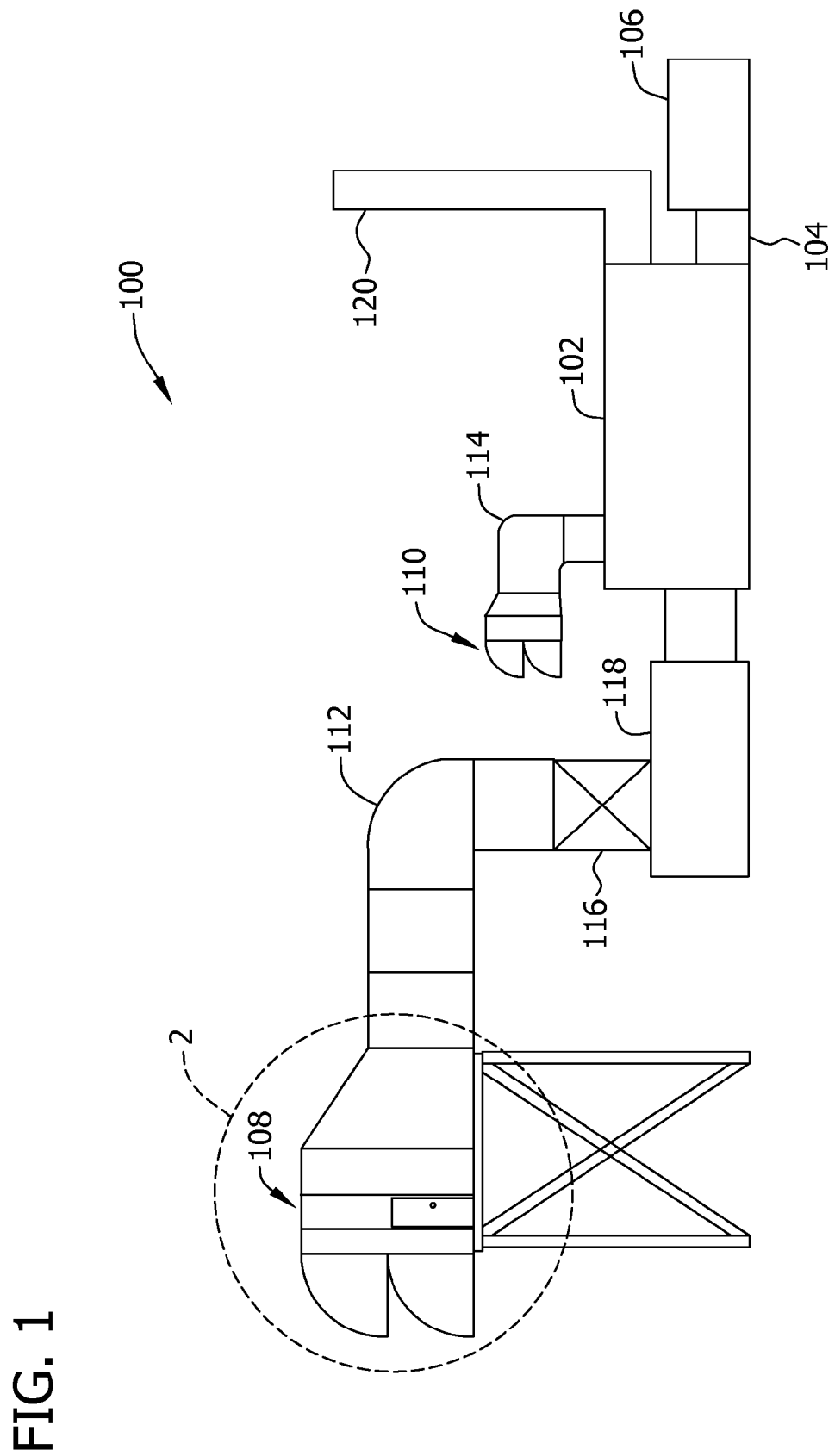
FIG. 1 is a schematic view of a gas turbine power system.

FIG. 1 illustrates an exemplary gas turbine power system 100. In the exemplary embodiment, gas turbine power system 100 includes a gas turbine housed within a gas turbine housing 102, a gear assembly housed within a gear housing 104, and a generator housed within a generator housing 106 such that the generator is operatively coupled to the gas turbine via the gear assembly. A first filtration system is housed within a first filter housing assembly 108 (e.g., a combustion filter housing assembly), and a second filtration system is housed within a second filter housing assembly 110 (e.g., a ventilation filter housing assembly) such that the first filtration system is coupled in flow communication with the gas turbine across a first duct assembly 112 and the second filtration system is coupled in flow communication with gas turbine housing 102 across second duct assembly 114. In one embodiment, a silencer assembly is housed within a silencer housing 116, and a compressor assembly is housed within a compressor housing 118 such that the silencer assembly and the compressor assembly are coupled between, and in flow communication with, the first filtration system and the gas turbine. Additionally, an exhaust stack 120 is coupled to gas turbine housing 102 such that exhaust stack 120 is in flow communication with the gas turbine. In other embodiments, gas turbine power system 100 may include any suitable operational component(s) and/or housings that facilitate enabling gas turbine power system 100 to function as described herein.

In operation, a flow of ambient air is channeled through first filter housing assembly 108, through first duct assembly 112, through the silencer assembly, and through the compressor assembly. The ambient air is then compressed via the compressor assembly and is directed through the gas turbine to facilitate a combustion process that drives the generator across the gear assembly, and exhaust from the combustion process is discharged from the gas turbine via exhaust stack 120. Meanwhile, ambient air is also channeled into gas turbine housing 102 through second filter housing assembly 110 and second duct assembly 114 to facilitate evacuating gas turbine housing 102 of heat and/or gas produced via operation of the gas turbine. As used herein, the term "air" refers to any gas or combination of gases and is not limited to the combination of Earth's atmospheric gases commonly referred to as "air."

Figure 2:
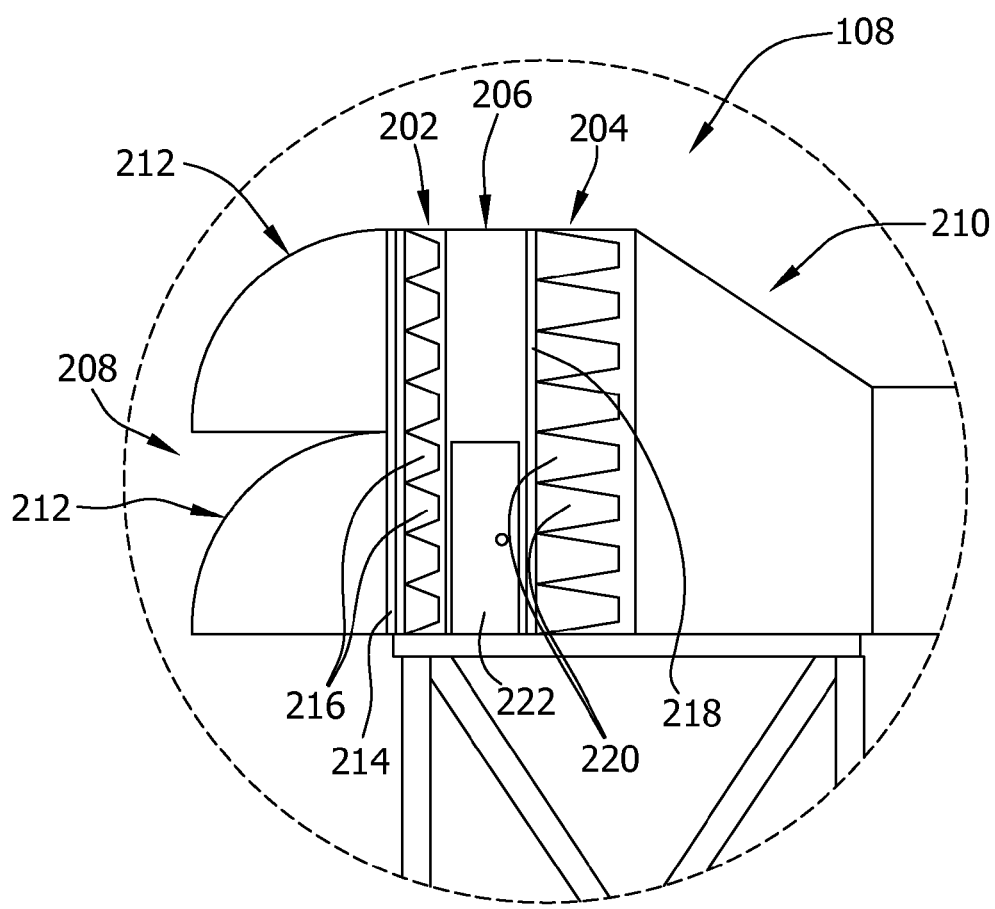
FIG. 2 is an enlarged schematic view of a filter housing of the gas turbine power system shown in FIG. 1 and taken within portion 2.

FIG. 2 is an enlarged schematic view of first filter housing assembly 108 shown in FIG. 1 and taken within portion 2. In the exemplary embodiment, first filter housing assembly 108 includes a first bag housing 202, a second bag housing 204, and an access housing 206 coupled between first bag housing 202 and second bag housing 204. A moisture separation system 208 is coupled to first bag housing 202, and a transition assembly 210 is coupled to second bag housing 204. In the exemplary embodiment, moisture separation system 208 includes a pair of weather hoods 212. In other embodiments, moisture separation system 208 may include any suitable number of weather hoods 212.

In the exemplary embodiment, first bag housing 202 includes a first filter holding frame 214 that supports a first set of filters 216, and second bag housing 204 includes a second filter holding frame 218 that supports a second set of filters 220. Access housing 206 includes a door 222 that provides access to first set of filters 216 and/or second set of filters 220 to facilitate maintenance and/or replacement of first set of filters 216 and/or second set of filters 220. In some embodiments, second filter housing assembly 110 may be substantially similar to first filter housing assembly 108. In other embodiments, second filter housing assembly 110 may be different than first filter housing assembly 108. Alternatively, first filter housing assembly 108 and/or second filter housing assembly 110 may include any suitable component(s) that facilitate enabling moisture separation system 208 to function as described herein. During operation of the gas turbine, ambient flows into weather hoods 212 and is directed through first set of filters 216, through second set of filters 220, through transition assembly 210, and toward the silencer assembly and the compressor assembly via first duct assembly 112 to facilitate the combustion process that drives the generator.

Figure 3:
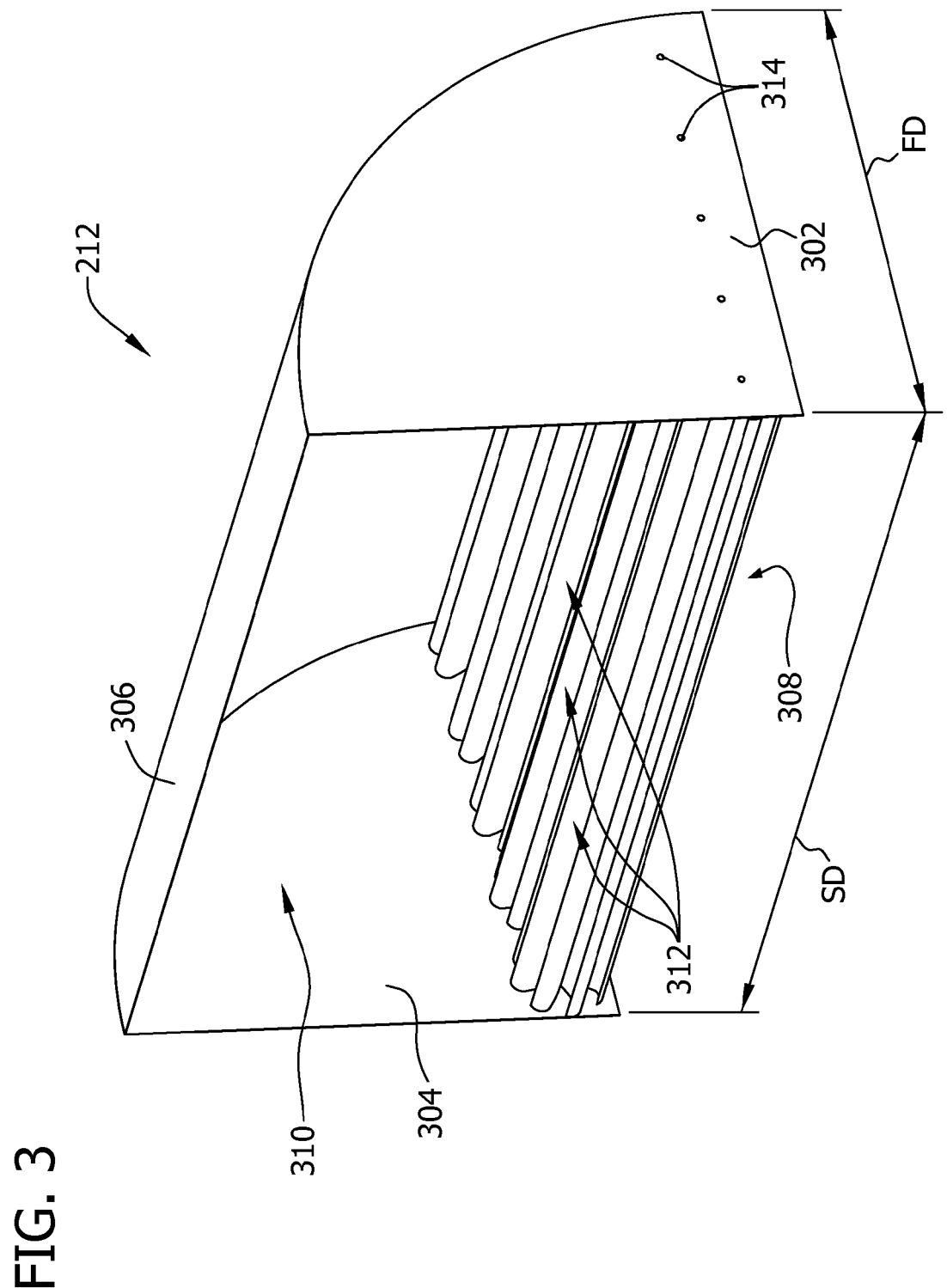
FIG. 3 is a perspective view of a weather hood of the filter housing shown in FIG. 2.

FIG. 3 is a perspective view of weather hood 212. In the exemplary embodiment, weather hood 212 includes a first side 302, a second side 304, and a cover 306 that extends from first side 302 to second side 304 to define an inlet 308 and an outlet 310 that is adjacent to inlet 308. In the exemplary embodiment, cover 306 has a substantially arcuate profile, and first side 302 and second side 304 have substantially triangular profiles such that inlet 308 and outlet 310 are substantially rectangular in cross-section (i.e., the rectangular cross-section of inlet 308 is defined by a first dimension FD and a second dimension SD). In other embodiments, inlet 308, outlet 310, and/or cover 306 may have any suitable shape that facilitates enabling moisture separation system 208 to function as described herein. In the exemplary embodiment, weather hood 212 is coupled to first bag housing 202 such that outlet 310 extends against first bag housing 202 and such that inlet 308 extends substantially perpendicularly from first bag housing 202. Alternatively, weather hood 212 may be coupled to first bag housing 202 in any suitable orientation that enables moisture separation system 208 to function as described herein.

In the exemplary embodiment, moisture separation system 208 also includes a plurality of moisture separators 312 that are rotatably coupled between first side 302 and second side 304 of weather hood 212 via a plurality of bearings 314. Moisture separators 312 substantially span second dimension SD of inlet 308 and are arranged side-by-side with one another such that inlet 308 is substantially covered in first dimension FD. In some embodiments, moisture separators 312 may extend only partially across inlet 308. In other embodiments, moisture separators 312 may be arranged in outlet 310 rather than inlet 308. Alternatively, moisture separators 312 may be mounted at any suitable location in gas turbine power system 100 that enables moisture separators 312 to function as described herein.

Figure 4:
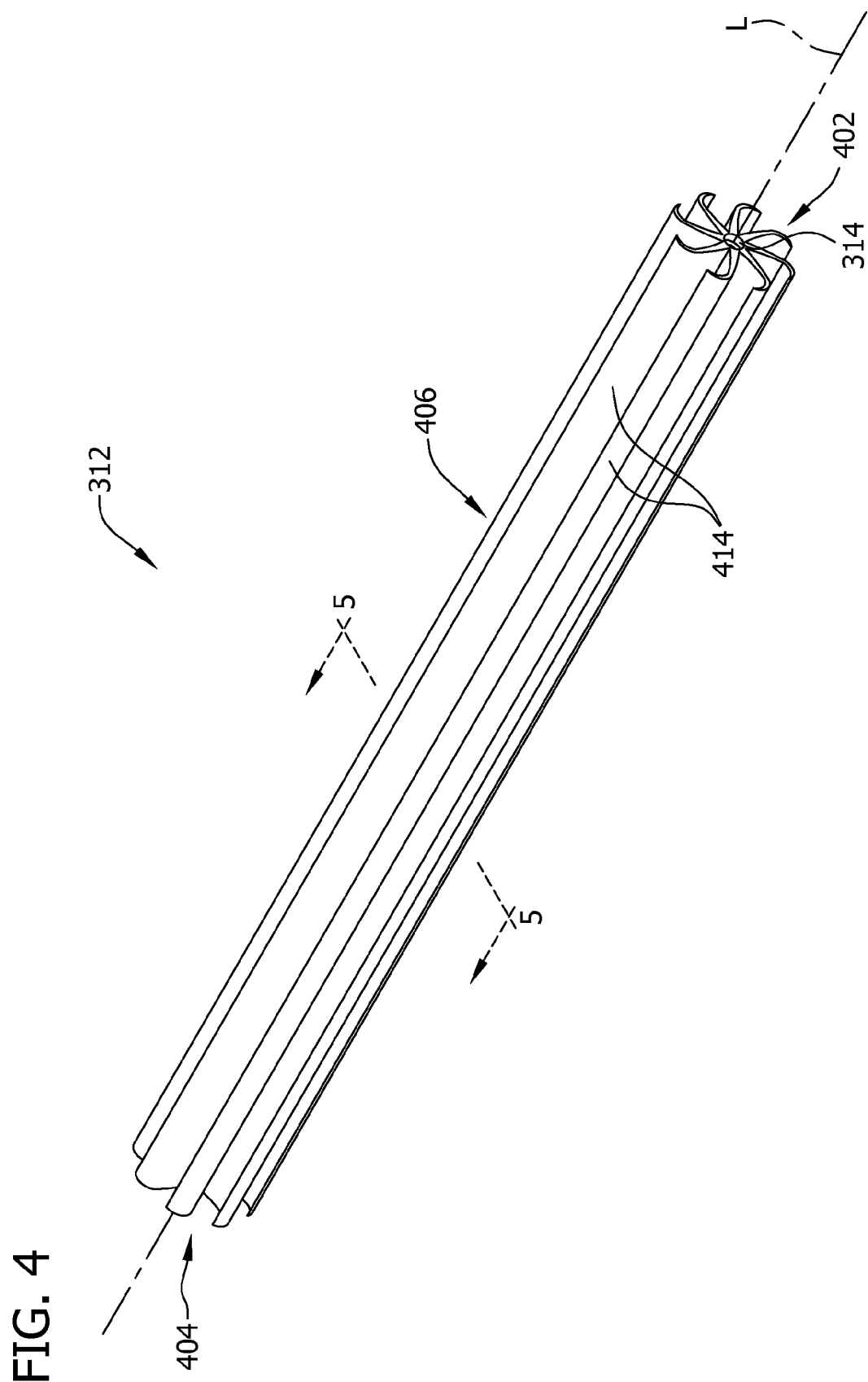
FIG. 4 is a perspective view of a moisture separator of the weather hood shown in FIG. 3.
Figure 5:
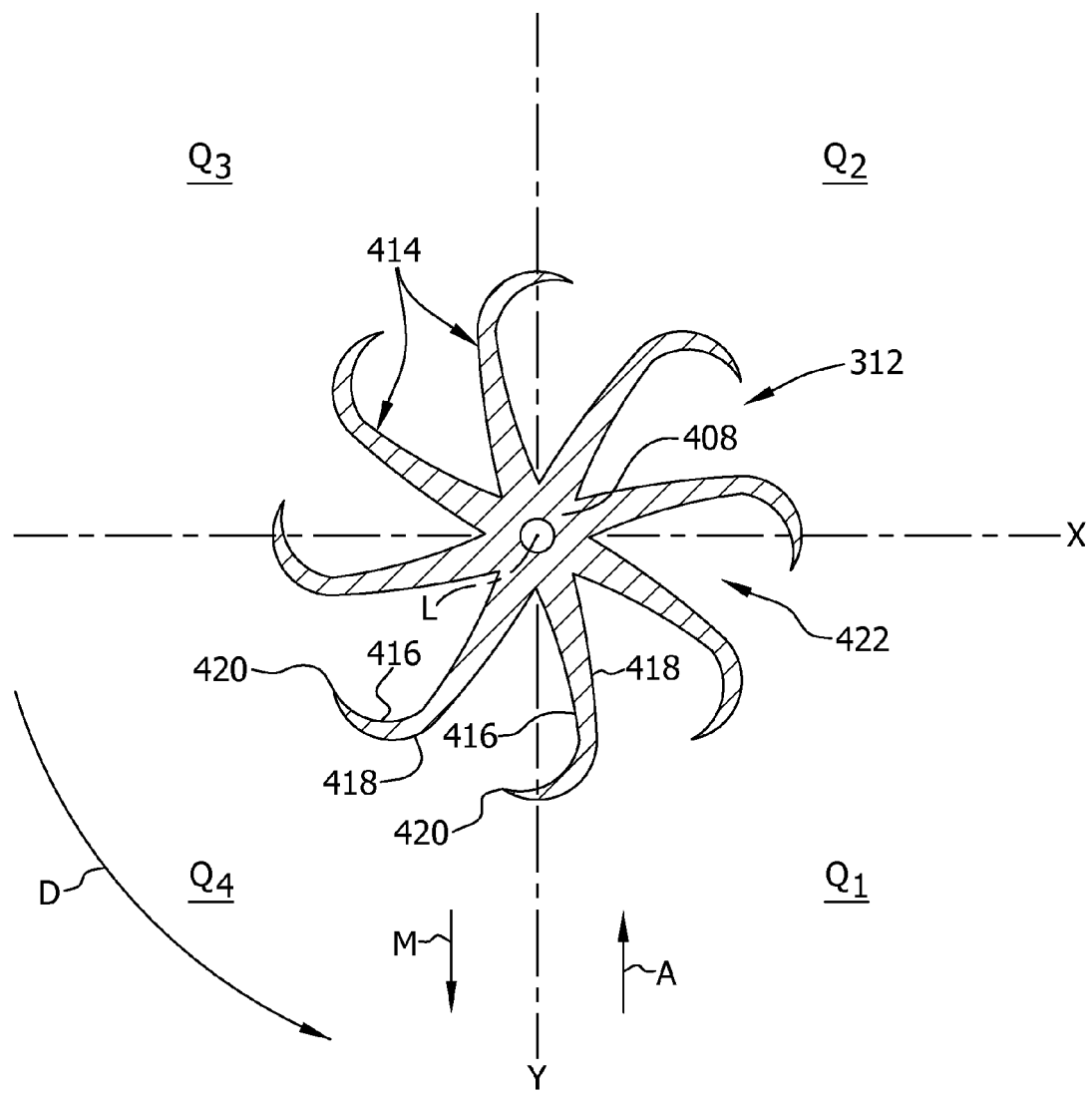
FIG. 5 is a sectional view of the moisture separator shown in FIG. 4 and taken along line 5-5.

FIG. 4 is a perspective view of moisture separator 312. FIG. 5 is a cross-sectional view of moisture separator 312 shown in FIG. 4 and taken along line 5-5. In the exemplary embodiment, moisture separator 312 includes a first end 402, a second end 404, and a body 406 extending from first end 402 to second end 404 along a longitudinal axis L. Body 406 includes a hub 408 and a plurality of vanes 414 that extend outward from hub 408 and substantially span body 406 from first end 402 to second end 404. Each vane 414 has an arcuate profile defined by an inner surface 416 and an outer surface 418 that converge at a tip 420. A moisture collection channel 422 is defined between inner surface 416 and outer surface 418 of adjacent vanes 414 such that moisture collection channel 422 tapers from tips 420 to hub 408 to facilitate collecting moisture within moisture collection channel 422 during rotation of moisture separator 312, as described below. In the exemplary embodiment, moisture separator 312 includes eight vanes 414 that define eight moisture collection channels 422. In other embodiments, moisture separator 312 may include any suitable number of vanes 414 that define any suitable number of moisture collection channels 422. In one embodiment, vanes 414 may be fabricated from a rigid material (e.g., a plastic material). In some embodiments, vanes 414 may be fabricated from a softer, more flexible material. Alternatively, moisture separator 312 (e.g., vanes 414) may have any suitable shape, may be fabricated from any suitable material, and/or may have any suitable orientation that facilitates enabling moisture separator 312 to function as described herein.

In the exemplary embodiment, as shown in FIG. 5, moisture separator 312 has a cross-sectional profile that lies on a plane defined by a first axis X and a second axis Y that segment the plane into a first quadrant $Q_1$, a second quadrant $Q_2$, a third quadrant $Q_3$, and a fourth quadrant $Q_4$. In operation, ambient air is drawn into weather hood 212, and the ambient air flows through first quadrant $Q_1$ and second quadrant $Q_2$ of the plane in an airflow direction A. Because moisture separator 312 is oriented such that longitudinal axis L is substantially perpendicular to the airflow, the airflow impacts vanes 414 and causes moisture separator 312 to rotate in a counterclockwise rotational direction D about longitudinal axis L in response. During a full revolution of moisture separator 312, each vane 414 rotates through first quadrant $Q_1$, second quadrant $Q_2$, third quadrant $Q_3$, and fourth quadrant $Q_4$. In some embodiments, adjacent moisture separators 312 may rotate in the same direction. In other embodiments, adjacent moisture separators 312 may rotate in different directions. Alternatively, a gear system and/or a belt system may be provided to facilitate controlling a rotational speed of moisture separators 312.

When the ambient air flows through first quadrant $Q_1$ in airflow direction A, the air impacts vanes 414 and changes directions. However, the moisture suspended within the air is prevented from changing directions due to inertia, and the moisture impacts vanes 414 and adheres to vanes 414 (e.g., adheres to inner surfaces 416). As vanes 414 rotate from first quadrant $Q_1$ through second quadrant $Q_2$, the moisture on vanes 414 (e.g., on inner surfaces 416) flows toward hub 408 such that the moisture is facilitated to be maintained in moisture collection channels 422 due, at least in part, to the arcuate shape of inner surface 416 and the force of gravity imparted on the moisture. After rotating through second quadrant $Q_2$, vanes 414 rotate through third quadrant $Q_3$ and fourth quadrant $Q_4$ such that the moisture flows from hub 408 toward tips 420 until the moisture is discharged from moisture collection channels 422 in a moisture discharge direction M due, at least in part, to centrifugal forces and the force of gravity on the moisture. In this manner, vanes 414 continually rotate during operation of gas turbine power system 100 to facilitate removing moisture from the ambient air that is drawn into gas turbine power system 100. The rotational motion of moisture separators 312 facilitates removing dust from inner surfaces 416 and/or outer surfaces 418 because the flow of moisture along vanes 414, in addition to the centrifugal and gravitational forces on the dust and the moisture, facilitate dislodging the dust and discharging the dust in moisture discharge direction M along with the moisture.

The methods and systems described herein facilitate separating moisture from a flow of air. Additionally, the methods and systems described herein facilitate removing dust from a moisture separator. As such, the methods and systems described herein facilitate reducing a need to clean and/or replace a moisture separator, thereby enhancing a useful life of a moisture separator and minimizing a cost associated with using a moisture separator.

Exemplary embodiments of a moisture separation system and a method of assembling the same are described above in detail. The methods and systems described herein are not limited to the specific embodiments described herein, but rather, components of the methods and systems may be utilized independently and separately from other components described herein. For example, the methods and systems described herein may have other applications not limited to practice with gas turbine power systems, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A method of assembling a moisture separation system for a gas turbine power system that includes a filter housing assembly and a weather hood coupled to the filter housing assembly, the weather hood defining an inlet for directing airflow into the filter housing assembly, said method comprising:
providing a moisture separator; and
coupling the moisture separator to the weather hood such that the moisture separator extends at least partially across the inlet, the moisture separator rotatable in response to the airflow to facilitate removing moisture from the airflow, wherein the moisture separator is rotatable about a longitudinal axis that is substantially perpendicular to the airflow.

2. A method in accordance with claim 1, wherein coupling the moisture separator to the weather hood comprises coupling the moisture separator to the weather hood such that the moisture separator substantially spans the inlet.

3. A method in accordance with claim 2, wherein coupling the moisture separator to the weather hood comprises coupling a plurality of the moisture separators to the weather hood such that the plurality of the moisture separators are arranged side-by-side to substantially cover the inlet.

4. A method in accordance with claim 1, wherein providing a moisture separator comprises providing the moisture separator with a hub and a plurality of vanes extending from the hub.

5. A method in accordance with claim 4, wherein providing the moisture separator with a hub and a plurality of vanes extending from the hub comprises providing the moisture separator with the plurality of vanes defining a plurality of moisture collection channels.

6. A method in accordance with claim 4, wherein providing the moisture separator with a hub and a plurality of vanes extending from the hub comprises providing the plurality of vanes as arcuately shaped vanes.

7. A method in accordance with claim 1, wherein coupling the moisture separator to the weather hood comprises coupling the moisture separator to the weather hood via a plurality of bearings.

8. A moisture separation system for a gas turbine power system that includes a filter housing assembly, said moisture separation system comprising:
a weather hood configured to be coupled to the filter housing assembly, said weather hood defining an inlet for directing airflow into the filter housing assembly; and
a moisture separator configured to be coupled to said weather hood such that said moisture separator extends at least partially across said inlet and such that said moisture separator is rotatable in response to the airflow to facilitate removing moisture from the airflow, wherein the moisture separator is rotatable about a longitudinal axis that is substantially perpendicular to the airflow.

9. A moisture separation system in accordance with claim 8, wherein said moisture separator is sized to substantially span said inlet.

10. A moisture separation system in accordance with claim 9, further comprising a plurality of said moisture separators, said plurality of said moisture separators configured to be arranged side-by-side to substantially cover said inlet.

11. A moisture separation system in accordance with claim 8, wherein said moisture separator comprises a hub and a plurality of vanes extending from said hub.

12. A moisture separation system in accordance with claim 11, wherein said plurality of vanes define a plurality of moisture collection channels.

13. A moisture separation system in accordance with claim 8, wherein each vane of said plurality of vanes is arcuately shaped.

14. A moisture separation system in accordance with claim 8, wherein said moisture separator is configured to be coupled to said weather hood via a plurality of bearings.

15. A moisture separator for removing moisture from airflow into a weather hood, said moisture separator comprising:
a first end;
a second end; and
a body extending from said first end to said second end along a longitudinal axis, said moisture separator configured to be coupled to the weather hood at said first end and said second end such that the longitudinal axis extends substantially perpendicular to the airflow and such that said moisture separator is rotatable about the longitudinal axis in response to the airflow, said body comprising to the longitudinal axis a plurality of vanes.

16. A moisture separator in accordance with claim 15, wherein said body further comprises a hub, said plurality of vanes extending outwardly from said hub.

17. A moisture separator in accordance with claim 16, wherein said plurality of vanes define a plurality of moisture collection channels.

18. A moisture separator in accordance with claim 17, wherein each vane of said plurality of vanes comprises a tip such that each moisture collection channel of said plurality of moisture collection channels extends from said tip to said hub and is tapered from said tip to said hub.

19. A moisture separator in accordance with claim 15, wherein each vane of said plurality of vanes is arcuately shaped.

20. A moisture separator in accordance with claim 15, wherein each vane of said plurality of vanes substantially spans said body from said first end to said second end.

* * * * *